US 9,787,766 B2

(12) United States Patent
Twiss

(10) Patent No.: US 9,787,766 B2
(45) Date of Patent: Oct. 10, 2017

(54) METHODS AND APPARATUS FOR TRAFFIC MANAGEMENT IN PEER-TO-PEER NETWORKS

(75) Inventor: Adam Twiss, Cambridge (GB)

(73) Assignee: Alcatel Lucent, Boulogne-Billancourt (FR)

(*) Notice: Subject to any disclaimer, the term of this patent is extended or adjusted under 35 U.S.C. 154(b) by 2344 days.

(21) Appl. No.: 10/544,277

(22) PCT Filed: Jan. 19, 2004

(86) PCT No.: PCT/GB2004/000213
§ 371 (c)(1),
(2), (4) Date: Dec. 23, 2005

(87) PCT Pub. No.: WO2004/073281
PCT Pub. Date: Aug. 26, 2004

(65) Prior Publication Data
US 2006/0168318 A1 Jul. 27, 2006

(30) Foreign Application Priority Data
Feb. 12, 2003 (GB) .................. 0303192.9

(51) Int. Cl.
G06F 15/16 (2006.01)
H04L 29/08 (2006.01)
H04L 12/701 (2013.01)

(52) U.S. Cl.
CPC ............ *H04L 67/104* (2013.01); *H04L 45/00* (2013.01); *H04L 67/1085* (2013.01);
(Continued)

(58) Field of Classification Search
CPC ................................... H04L 67/104
(Continued)

(56) References Cited

U.S. PATENT DOCUMENTS 7,062,555 B1 * 6/2006 Kouznetsov et al. ........ 709/225
2002/0010866 A1 * 1/2002 McCullough et al. ....... 713/201
(Continued)

FOREIGN PATENT DOCUMENTS

GB PCT/GB2004/00213 1/2004

OTHER PUBLICATIONS

Ciglarič, Mojca, et al., Content Networks: Distributed Routing Decisions in Presence of Repeated Queries, Proceedings of the International Parallel and Distributed Symposium (IPDPS'03), 2003, six pages.

(Continued)

Primary Examiner — Kevin Mai
(74) Attorney, Agent, or Firm — Kramer & Amado, P.C.

(57) ABSTRACT

Methods and apparatus relating to routing and caching systems for reducing traffic and the bandwidth used by decentralized peer-to-peer (P2P) file sharing networks is described. The peer-to-peer network operates over an underlying network including first and second network portions. The method includes routing a peer-to-peer message in one of said network portions with an intended destination in the other of said network portions to a gateway between peer-to-peer modes residing on said first and second network portions. The method further includes controlling transport of said message at said gateway to limit propagation of said message into said other of said network portions.

44 Claims, 10 Drawing Sheets

(52) U.S. Cl.
CPC ........ *H04L 67/1093* (2013.01); *H04L 69/329* (2013.01); *H04L 67/2842* (2013.01)

(58) Field of Classification Search
USPC ........................................................ 709/229
See application file for complete search history.

(56) References Cited

U.S. PATENT DOCUMENTS

| | | | |
|---|---|---|---|
| 2002/0049760 A1* | 4/2002 | Scott et al. ...................... | 707/10 |
| 2002/0062375 A1* | 5/2002 | Teodosiu et al. ............. | 709/226 |
| 2002/0147810 A1 | 10/2002 | Abdelaziz et al. | |
| 2002/0194108 A1* | 12/2002 | Kitze .............................. | 705/37 |
| 2003/0009586 A1 | 1/2003 | Harrow et al. | |
| 2003/0208621 A1* | 11/2003 | Bowman ....................... | 709/242 |
| 2004/0088646 A1* | 5/2004 | Yeager et al. ................ | 715/500 |
| 2004/0148434 A1* | 7/2004 | Matsubara et al. ........... | 709/246 |
| 2005/0149481 A1* | 7/2005 | Hesselink et al. ................ | 707/1 |
| 2006/0117093 A1* | 6/2006 | Aviani et al. ................. | 709/217 |
| 2006/0168304 A1* | 7/2006 | Bauer et al. .................. | 709/232 |
| 2007/0097885 A1* | 5/2007 | Traversat et al. ............. | 370/254 |
| 2007/0192474 A1* | 8/2007 | Decasper et al. ............. | 709/223 |
| 2009/0106355 A1* | 4/2009 | Harrow et al. ............... | 709/203 |
| 2009/0182842 A1* | 7/2009 | Dutta et al. ................... | 709/218 |

OTHER PUBLICATIONS

Sen, Subhabrate, et al, *Analyzing Peer-to-Peer Traffic Across Large Networks*, IEEE/ACM Transactions on Networking, vol. 12, No. 2, Apr. 2004, pp. 219-232.

Gisik, Kwon, et al., *An Efficient Peer-to-Peer File Sharing Exploiting Hierarchy and Assymetry*, IEEE/IPSJ 2003 Symposium on Applications and Internet (*Saint'03*) (online), Jan. 27, 2003, http://www.public.asu.edu/~kryu1/papers/PASS-SAINT03.pdf, p. 226, Abstract.

Harrison, Ann, *Packeteer: Another take on limiting P2P traffic, Network World Peer-to-Peer Newsletter* (online), Apr. 3, 2002, http://www.nwfusion.com/newsletters/fileshare/2002/01297785.html.

Oram, Andy, *Peer-to-peer: Harnessing the Benefits of a Disruptive Technology passage*, Mar. 15, 2001, Chapter 8, "Gnutella," pp. 94-122.

EPO Examination Report dated Jun. 5, 2011, for corresponding European Patent Application No. 04703211.5.

Evangelos P. Markatos, "Tracing a Large-Scale Peer to Peer System: An Hour in the Life of Gnutella", 2002, 2nd IEEE/ACM International Symposium on Cluster Computing and the Grid, pp. 65-74.

\* cited by examiner

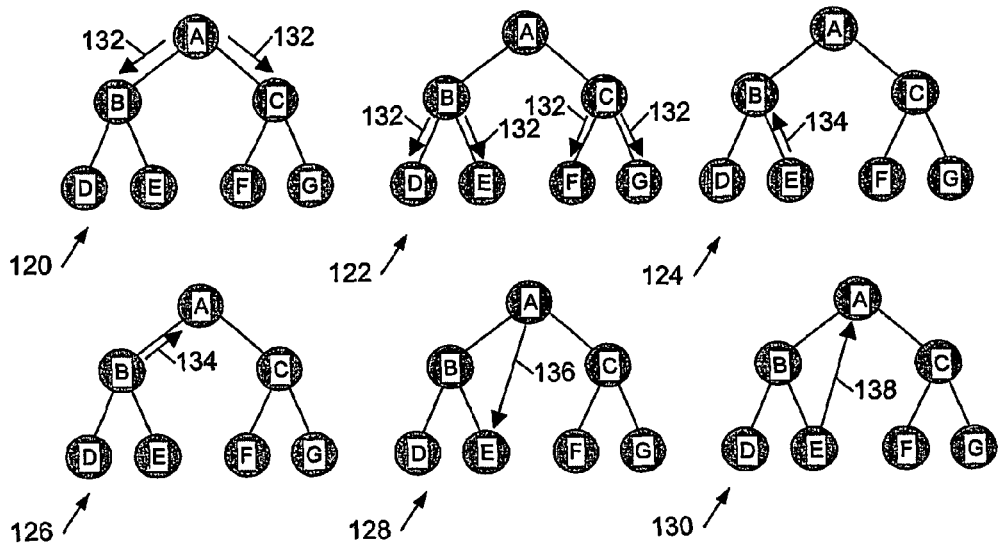
Figure 1c
(PRIOR ART)
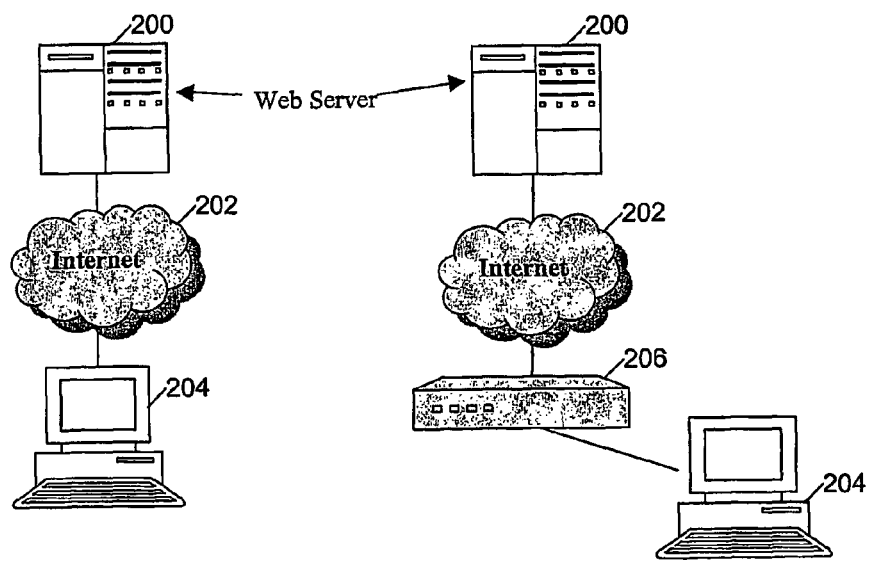
Figure 2a
(PRIOR ART)
Figure 2b
(PRIOR ART)

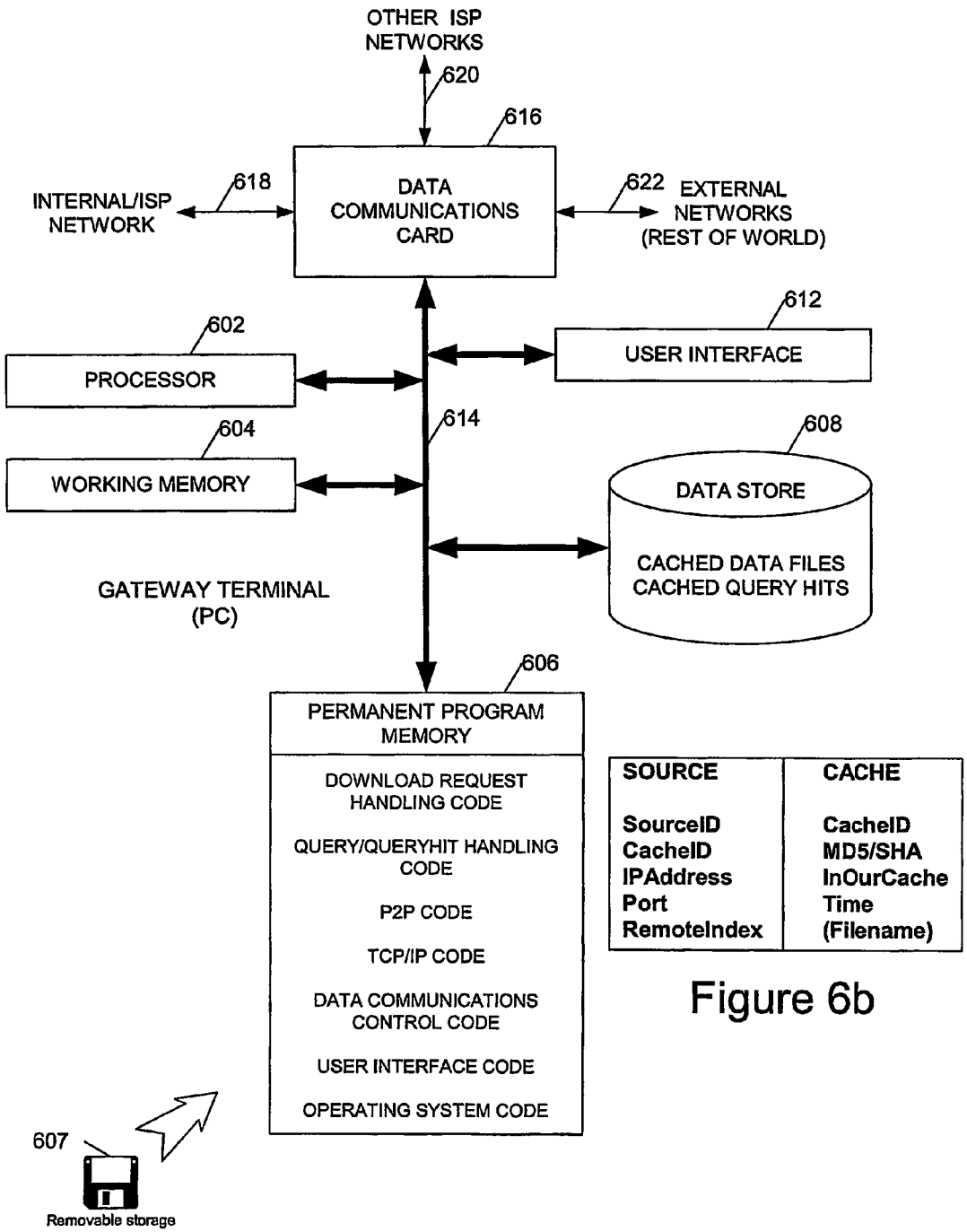
Figure 6b
Figure 6a

METHODS AND APPARATUS FOR TRAFFIC MANAGEMENT IN PEER-TO-PEER NETWORKS

CROSS-REFERENCE TO RELATED APPLICATIONS

This application is the U.S. National Phase under 35 U.S.C. §371 of International Application No. PCT/GB2004/000213, filed Jan. 19, 2004, designating the United States and published in English on Aug. 26, 2004, as WO 2004/073281 A2, which claims priority to United Kingdom Application No. 0303192.9, filed Feb. 12, 2003.

FIELD OF THE INVENTION

This invention is generally concerned with apparatus, methods and computer program codes for managing and reducing traffic in peer-to-peer networks. More particularly the invention relates to routing and caching systems for reducing bandwidth used by decentralised peer-to-peer (P2P) file sharing networks.

DESCRIPTION OF RELATED ART

Generally a peer-to-peer network comprises a plurality of nodes where each node represents a computer running a compatible peer-to-peer (P2P) client. Generally a node will operate as both a server and a client, and it may then be referred to as a servent (SERVer plus cliENT). Each node has a number of peers that it maintains direct connections to, the nodes or peers interacting as equals. A peer-to-peer network is sometimes referred to as an overlay network since it overlays an underlying physical network topology and may operate at a relatively high network layer, such as the application layer. Generally the topology of a P2P network bears little or no resemblance to the underlying physical network topology, as will be explained further below. Most often P2P networks are implemented over the Internet, although they may also may be implemented on other networks such as intranets and extranets.

Peer-to-peer networking has a variety of applications including distributed processing and file sharing. In file sharing P2P systems users or nodes may exchange data files or fragments of data files without the need for the files (or fragments) to be stored on a central server. This contrasts with worldwide web protocols in which web clients download data held on web servers which are named, and specified by a fixed internet protocol (IP) address. By contrast in a P2P network a data file may be found one, or more typically a plurality of nodes the addresses of which need not be fixed and may change over time as nodes add or remove files from their local storage. (It will be appreciated, however, that the IP address of any particular computer at a node may remain fixed). It will be recognised that the structure of P2P networks imposes special problems when searching for and downloading files.

Peer-to-peer networks fall into two broad categories, centralised P2P networks 100 and decentralised P2P networks. FIG. 1a illustrates an example of a centralised P2P network and FIG. 1b illustrates an example of a decentralised P2P network 110. The centralised P2P network has one or more central servers 102 to which each user node 104 must connect. Central server 102 maintains a centralised index or directory of shared files, user nodes or peers 104 uploading lists of files which they are prepared to make available to this central index. This central index may be queried by a node 104 to locate a file, following which the file may be directly retrieved from a node which the central index shows has the file available. In a centralised P2P network a user must register with the central server 102, which has a fixed, known address. Thus in a centralised P2P network there is a restricted number of points of entry into the network, defined by these central servers. In P2P system 100 central server 102 maintains a list of users who are logged onto the network, lists of files shared at any given moment by a user, and IP addresses of clients logged onto the central server to search for shared files. A search result generally comprises a list of user names and IP addresses and of corresponding file names found by the central server 102.

By contrast in the decentralised P2P network 110 of FIG. 1b a user may join the network at any point and there is no requirement for registration with a single central server or with one of a few particular, designated central servers. Thus in FIG. 1b the user nodes 112, or peers, act as both clients and servers at the same time (servents) to allow a request for a resource such as a file to propagate through the network until a node or peer at which has the resource is found.

More sophisticated P2P networks may include "supernodes" or "ultrapeers" each with a plurality of "leaf" nodes; sometimes these are referred to as controlled decentralised P2P networks. Such supernodes may index content available from nodes in a nearby neighbourhood, such as content available from the leaf nodes, as well as communicating among themselves, for example to satisfy queries. Supernodes may be dynamically selected, for example by defining an initial set of supernodes and then allowing nodes (peers) to vote amongst themselves to elect more. In terms of the searching process this is analogous to identifying well-connected people to ask first about the availability of a file or other resource.

The topology of a decentralised P2P network is not generally structured to be efficient in respect to the underlying physical network(s). File search requests or queries are generally broadcast from each node to all its neighbouring nodes, and query responses are sent back along the route defined by the chain of queried nodes. In both decentralised and centralised networks, however, once a file has been located a direct connection such as a socket connection (address and port number) is generally established between the node at which the file is available and the requesting node. A node may also initiate a plurality of connections to other nodes or peers to attempt a plurality of concurrent downloads, for example to use the fastest, or a node may download multiple fragments of a file, for example in parallel from multiple peer nodes.

Thus the traffic on P2P file sharing networks may be categorised into network traffic and download traffic, the network traffic comprising, for example, messages involved in maintaining the P2P network infrastructure together with search requests and the responses they generate. It will be appreciated from the foregoing that decentralised P2P networks are able to generate significant quantities of network traffic. Furthermore since many users of file sharing P2P networks use the network to share multimedia data downloaded file sizes and the download traffic is also usually large. Currently P2P file sharing networks are responsible for a significant proportion of data traffic on the Internet, and in particular on the networks of Internet Service Providers (ISPs) who provide internet connectivity to consumers over broadband connections. Typically P2P users generate around 50% of this traffic. There is a considerable cost associated with routing and relaying this information, which is one problem which the present invention addresses.

Referring to FIG. 1c, this shows six steps 120-130 illustrating the location and retrieval of a file in a decentralised P2P network. In this decentralised P2P network every P2P user is a node on the network and each node maintains a connection to a small number of other nodes, in this example two but more typically four. At step 120 node A issues a query 132 to nodes B and C which propagates at step 122 to nodes D, E, F and G. At step 124 node E sends a response or query hit 134 back to node B and thence, at step 126, back to node A. At step 128 node A then issues a file download for Get request 136 directly to node E which responds, at step 130, by sending the requested file 138 to node A.

As each node selects its peer nodes at random the "neighbouring" nodes of a peer may physically be on the other side of the world. This is illustrated in table 1 below, which shows the direct peers that a Gnutella P2P client running in Cambridge, England was maintaining at the time of the measurements.

TABLE 1

| Peer Address | City | Region | Country |
| --- | --- | --- | --- |
| 24.126.84.82 | Longbeach | California | USA |
| 24.214.24.23 | Charlestone | South Carolina | USA |
| 211.212.67.35 | Seoul | Kyonggi-do | S. Korea |
| 24.159.97.89 | Suwanee | Georgia | USA |
| 24.191.31.30 | Fairfield | Connecticut | USA |
| 68.47.88.10 | Augusta | Georgia | USA |
| 24.87.3.108 | Rickmard | Ontario | Canada |
| 64.231.79.149 | Toronto | Ontario | Canada |
| 12.232.111.21 | Livermore | California | USA |
| 66.76.33.104 | Tyler | Texas | USA |
| 193.2.154.124 | Ljubljana | Ljubljana | Slovenia |
| 80.135.77.251 | Dortmund | Nordrhein-Westf | Germany |
| 200.16.17.88 | Cordoba | Cordoba | Argentina |
| 213.66.224.126 | (unknown) | (unknown) | Sweden |
| 208.137.80.187 | Defiance | Ohio | USA |
| 66.214.142.214 | Glendale | California | USA |

This illustrates one of the main problems of P2P networks, which is that such application level and other P2P networks do not take into account geographical locations for usage costs associated with the underlying physical networks. A result of this is that each node in an ISP's network typically has a number of peers from all over the world and is constantly relaying large numbers of queries, and the corresponding query results.

A P2P query has an associated time to live (TTL) which defines the number of network hops the query is permitted to make. At each hop from one network node to another the TTL counter is decremented until it reaches zero, when the query is no longer propagated. A typical initial value of the TTL counter is T=7 and P2P peers generally refuse packets with a TTL value greater than a permitted maximum to restrict the use of network resources. However it can be seen that if each node maintains connections to P other nodes the total number of computers through which a query propagates is approximately determined by $T^P$ and for say, P=4 and T=7, $T^P$=16384. It can therefore be seen that P2P networks generate large quantities of network traffic.

Currently decentralised P2P systems include Gnutella (with applications such as Morpheus, Bearshare and Limewire), FastTrack and KaZaA, the latest versions of which use the above described supernode concept; an example of a centralised P2P network is Napster. There are many uses for such P2P networks including the distribution of free software such as Linux code, the distribution of games, and instant messaging. Furthermore because the originator of a query or message is kept secret P2P networks can be useful in countries where freedom of speech is limited. However research indicates that at least in some networks the bulk of P2P traffic comprises audio and video data files such as MP3 and AVI files (see, for example, study at the University of Washington, "An Analysis of Internet Content Delivery", Stefan Saroiu, Krishna P. Gummadi, Richard J. Dunn, Steven D. Gribble, and Henry M. Levy, Department of Computer Science Engineering, Washington, Seattle, Wash. 98195-2350, USA, in proceedings of the 5$^{th}$ Symposium on Operating Systems Design and Implementation, Boston, Mass., December 2002). Such audio and video data may include previews of audio tracks, film trailers and the like. It has been found (ibid) that the median object size for P2P networks is approximately 4 MB, that is approximately 1000 times the average web document size (2 KB) and that the average bandwidth consumption of a P2P peer is approximately 90 times that of a web client.

The University of Washington study (ibid) also explored the benefits to be obtained from a theoretical cache for KaZaA P2P traffic, finding that P2P caching should potentially be highly beneficial. However no indication was provided as to how such caching may be implemented in practice since, as will be appreciated from FIG. 1b, the distributed nature of a decentralised peer-to-peer network would seem to make caching impossible. Indeed the paper by Sariou et al., explicitly stated that "our goal is not to solve (or even identify) all of the complexities of P2P caching but rather to gain insight into how important a role caching may play".

The caching of web content is an established technology that is widely used. The first web caching software was probably the CERN web proxy (developed at the CERN laboratories in Switzerland by Tim Bernes-Lee). Version 2.16 (dated February 1994) contained the core caching functionality. Several other companies (Inktomi, Network Appliance & CacheFlow) developed and sold web caching products, and the freely available Squid web cache is widely used.

With a web proxy cache, web requests (which use the Hyper-Text Transport Protocol or HTTP) get sent via a proxy rather than going directly to the server that hosts the content. This proxy can store (or "cache") the data it downloads so that if another user requests the same web page that the data can be sent from its local copy. Web proxy caches can reduce internet bandwidth usage and "speed up" access to the web.

FIGS. 2a and 2b illustrate the principle of a web cache, in which a web server 200 communicates over the Internet 202 with a computer 204. In FIG. 2a computer 204 talks directly the remote web server 200 but in FIG. 2b computer 204 first communicates with a local proxy server 206 which may send back copies of the requested data that it has cached locally.

The distributed nature of a P2P network has led to the belief that the efficient caching in a P2P system is not possible. Traffic management within a P2P network has therefore focused on a relatively crude technique as limiting the time to live (TTL) of a P2P packet, although, one company, SandVine Inc of Waterloo, Ontario, Canada, offers a product (the PPE8200) which purports to lower network costs for peer-to-peer traffic by redirecting P2P downloads to hosts on a lower cost path for attempting hosts on a higher cost path.

SUMMARY OF THE INVENTION

According to a first aspect of the present invention there is therefore provided a method of reducing traffic in a decentralised peer-to-peer network, said peer-to-peer network operating over an underlying network comprising first and second network portions, the method comprising routing a peer-to-peer message in one of said network portions with an intended destination in the other of said network portions to a gateway between peer-to-peer nodes residing on said first and second network portions; and controlling transport of said message at said gateway to limit propagation of said message into said other of said network portions.

The gateway resides at the boundary of a service providers network to facilitate control of traffic from the one network portion that is, for example, the first network portion managed by, say, an ISP and the other network portion, in this example the second network portion, comprising, say, the rest of the world. By routing peer-to-peer messages, preferably all peer-to-peer messages intended for the other network portion, via the gateway a range of transport control and traffic reduction functions become possible. For example propagation of a message into the second network portion may be prevented either by ignoring the message or redirecting the message or, as described further below, responding to the message from a cache. The message controlled at the gateway may comprise a query message or additionally or alternatively propagation of a request for a resource made in response to the result of a query message (for example, in response to a query hit) may be limited, for example by controlling a subsequent file download or GET request. The routing may be performed by configuring a router to transparently route all outgoing and potentially also all incoming P2P traffic via the gateway. Thus the first and second network portions may comprise, for example, portions of an underlying physical or logical network or domains of an IP-based internet.

The concept of a gateway node allows the number of peer-to-peer connections across a boundary between the first and second network portions to be limited, thus controlling the bandwidth across the boundary and hence also facilitating control of data transport costs. Furthermore since in preferred embodiments all P2P traffic is routed via the gateway node this node may act as a cache (for inbound and/or outbound traffic) and/or router and/or bandwidth throttle and/or content filter. Thus, for example, unsuitable or illegal content may be blocked at the gateway or messages may be blocked to limit or throttle the traffic between the first and second network portions. A message may also be redirected to a peer-to-peer node known to the gateway within its network portion. Additionally or alternatively the gateway may respond to the message. Preferably, therefore, the gateway comprises an active peer-to-peer node of the peer-to-peer network.

A query hit or search result message passing through the gateway may be rewritten en route so that the requesting node requests a file from a node different from that which responded positively to the search request. Such rewriting may comprise rewriting an index to a file within the search result or query hit or additionally or alternatively the response may be rewritten to disguise the address to which the response originated or to substitute an address, for example, an address of the gateway node, for an address in the response. In the preferred embodiment the gateway comprises a cache for caching responses to queries and/or files requested in file requests. In this way search and/or download traffic may be reduced; preferably both search and download data is cached. It will be appreciated that the concept of a gateway node facilitates such caching. Preferably data is cached with a time stamp to allow the data to be discarded after expiry of a period of time. The skilled person will appreciate that since in some P2P networks downloading of partial files or fragments is permitted, a file cache may store such file fragments and these may then be retrieved and served to a requesting node in accordance with the P2P protocol.

Caching in a P2P network presents particular problems associated with the very large volume of data transferred. Monitoring P2P networks suggests that the volume of file data available for downloading is currently of the order of 5 Petabytes ($5 \times 10^{12}$ bytes). A general rule of thumb estimate is that to be effective a cache should be at least $1/100^{th}$ of the data transferred, in this case of the order of 50 TB, and preferably more. Thus caching at this scale would appear to be impractical. However, the inventor has recognised that much of the traffic on a P2P network comprises multiple replications of the same files, although not necessarily with the same file name. Thus, for example, many nodes may store a Star Wars (Trademark) trailer, with different users adopting different names for the trailer although storing an identical file. This recognition has led to the concept of associating a content identifier such as a hash function with each file and/or file requests cached. As the skilled person will know, a hash value represents concisely the longer message or file from which it was computed, and is thus able to serve an identifier of content irrespective of file name. Thus in preferred embodiment such a hash function, sometimes known as a message digest or checksum is used as an index into the cache. Where the cache stores search responses or query hits, these preferably include a hash value to facilitate their recall, and where a query hit is rewritten, preferably it is rewritten with such a hash value. Likewise where file data is cached this is preferably cached in association with a hash value to facilitate its identification irrespective of a requested filename. Such a hash value may also be used to retrieve additional file or data source-related information from a cache. In this way, duplicate files, that is files with the same contents but, for example, with different names and/or from different networks that these need only be stored once in the cache. Identification of duplicate files may be performed such that duplicate files are not stored or additionally or alternatively duplicate files may be weeded from the cache at intervals.

In some P2P networks messages have a "unique" identifier and in such networks the gateway may operate to limit propagation of a message between the first and second network portion, each message is only ever relayed once across an ISP boundary. Tracking P2P messages in this way also facilitates selective routing of messages based upon the cost of the underlying physical network, and similarly facilitates satisfying download requests the cost of data transport (monetary, bandwidth or other) over any network portion.

In a related aspect the invention provides a computer network message controller for reducing traffic in a decentralised peer-to-peer network, said peer-to-peer network operating over a physical network comprising first and second network portions, said network message controller comprising a router for routing a peer-to-peer message in one of said first network portions with an intended destination in the other of said network portions to a gateway between peer-to-peer nodes residing on said first and second network portions; and a gateway controller configured to control transport of said message into said other of said network portions In a further related aspect the invention provides A gateway controller, in particular for the computer network message controller of claim 18, for reducing traffic in a decentralised peer-to-peer network operating over an underlying network comprising first and second network portions, the controller being configured for operation at a gateway between peer-to-peer nodes residing on said first and second network portions, the gateway controller comprising an interface for said first and second network portions, for receiving a peer-to-peer message in one of said first network portions with an intended destination in the other of said network portions; and a controller configured to control transport of said message into said other of said network portions.

The invention also provides a peer-to-peer network cache comprising a network interface for interfacing to a network over which said peer-to-peer network operates; a data store for storing cached data files each in association with a data file identifier, a data file identifier comprising a value computed from the contents of a data file it identifies program memory storing processor control code; and a processor coupled to said network interface, to said data store, and to said program memory for implementing said processor control code, said code comprising code for controlling the processor to read peer-to-peer traffic on said network; identify a request for a data file within said peer-to-peer traffic; identify the requested data file from a said data file identifier within said peer-to-peer traffic; and provide said requested data file from said data store to a peer-to-peer node making said request.

Embodiments of the peer-to-peer network cache provide as described above for P2P caching, particularly in decentralised P2P networks. In a third embodiment the P2P network cache comprises an active node on the P2P network. The data store for storing the cache data files may be provided with commonly downloaded or large audio or video data files, for example manually, but preferably data within the data store is obtained from the P2P network. As previously mentioned a data file identifier preferably comprises a hash value so that identical files with different file names have the same hash value. Preferably a collision resistant-function is employed such as MD2, MD5 or SHA1 (see below).

The use of a data file identifier comprising of a value computed from the contents of a data file it identifies facilitates caching in a P2P network when this might otherwise considered infeasible due to the large volume of data to be stored.

The request for a data file identified by the processor may comprise a Query (or search request) or a GET (or file request) message. The data file identifier by which the requested data file may be identified may either comprise a data file identifier such as a hash value in a query hit message sent by a machine in response to a query or the data file identifier may be included within the GET (or file request) command. The identified, requested data file may then be provided by the hash.

In some embodiments the code may further comprise code to identify and rewrite a response to the request, for example to rewrite an index in the response so that it refers to the data store (that is the cache) so that when the file is requested it is the cache that is indexed. Where the peer-to-peer network cache operates at a gateway as described above (preferable, but not essential) there may be no need to rewrite an IP address within the response so that it points to the cache since being located at the gateway it is able to intercept a file download request prior to its reaching its intended destination. However in other circumstances, for example where P2P traffic is not routed through the cache, a source identifier within the response (IP address and/or port number) may also be rewritten.

Where a requested data file is not yet stored in the cache the file may be downloaded and stored in the cache and also relayed to the requester. Where the results of previous file search requests (query hits) have been stored in the cache these may indicate one or more sources for the requested file; alternatively a source may be obtained from a source specified by the requester in the download request. A hash value for the file may either be retrieved with the file or calculated once the file has been downloaded into the cache. Alternatively file data for the cache may be obtained by snooping the passing traffic where a previously cached query hit included such a value.

In a preferred embodiment the code includes code to identify duplicate data files and limit the number of such files, for example to a single copy of each identical data files, even where such files have different names.

In a corresponding aspect the inventions provides a method of reducing traffic in a distributed peer-to-peer network, the method comprising monitoring peer-to-peer traffic of said network; identifying a request for a data file within said peer-to-peer traffic; identifying the requested data file from a data file identifier associated with said request within said peer-to-peer traffic; and providing said requested data file from a cache to a peer-to-peer node making said request.

Again the request for a data file may be a query and an associated query hit response may include the data file identifier, or the request itself may include the identifier. Preferably the peer-to-peer traffic monitoring takes place at a gateway between two different physical network portions or domains, for example between physical network portions distinguished by different most significant bits of their IP addresses.

In a further aspect the invention provides a peer-to-peer network cache for modifying peer-to-peer network traffic, the network cache comprising a network interface for interfacing to a network over which said peer-to-peer network operates; a data store for storing digital fingerprint data for identifying data files, and corresponding data file source identifiers; and a program memory storing processor control code; and a processor coupled to said network interface, to said data store and to said program memory for implementing said processor control code, said code comprising code for controlling the processor to read peer-to-peer traffic on said networks; identify a response to a peer-to-peer file request within said peer-to-peer traffic, said response including a digital fingerprint of a requested file; identify from said data store an alternative source for said requested file to a source of said response; and identify a response to a peer-to-peer file request within said peer-to-peer traffic, said response including a digital fingerprint of a requested file; identify from said data store an alternative source for said requested file to a source of said response; and reply to said file request using said alternative source.

Caching data file source identifier together with corresponding digital fingerprint data for identifying the data files, such as hash value data, facilitates modifying (such as redirecting) and reducing search requests/response traffic in a P2P network, particularly a decentralised P2P network. The P2P file request may either comprise a query for a download request. If the request comprises a query the reply may reply a query hit comprising a cache index for retrieving a cache file; if the file request comprises a GET or download request the reply may comprise the requested file, for example served from a file cache or obtained from another source as identified by a source identifier stored in the data store. Thus the reply may involve downloading a file from the alternate source and then forwarding the downloaded file to the requester. If the file request comprises a query and a source for the requested file is in the cache the reply may comprise a rewritten query hit. If the file request comprises a download request and the requested file is not cached the requested file may be obtained from the alternative source to allow a response to the request.

In a preferred embodiment the processor control code further comprises code to populate the cache, for example by monitoring query and query hit traffic for storing in the data store. Where a requested file is cached, source identification data accompanying the digital fingerprint data of the file may simply comprise a flag to indicate that the file is stored in the cache. As previously mentioned where data file data is cached this may comprise complete or partial file data.

In a further aspect the invention provides a method of modifying peer-to-peer network traffic in a distributed peer-to-peer network, the method comprising reading peer-to-peer traffic on said network; identifying a response to a peer-to-peer file request within said peer-to-peer traffic, said response including a digital fingerprint of a requested file; identifying from a cache an alternative source for said requested file to a source of said response; and replying to said file request using said alternative source.

Embodiments of the above described methods may be implemented using computer program code, for example on a general purpose or dedicated computer system. Such program code, and the above described processor control code, may be provided on any conventional carrier medium, such as a hard or floppy disk, ROM or CD-ROM, or on an optical or electrical signal carrier for example via a communications network. The code may comprise code in any conventional programming language, for example C, or assembler or machine code. Such code may be distributed over a plurality of coupled components, for example over a network, as is well known to those skilled in the art. Likewise data processing and storage functions may be separated but linked, for example by a network. Embodiments of the invention may be implemented on a variety of communications network, but are particularly suited to implementation in a P2P network running over an IP-type protocol.

BRIEF DESCRIPTION OF THE DRAWINGS

These and other aspects of the present invention will now be further described by way of example only with reference to the accompanying figures in which:

FIGS. 1a, 1b and 1c show, respectively, an example of a centralised peer-to-peer network, an example of a decentralised peer-to-peer network, and steps illustrating location and retrieval of a file in a decentralised peer-to-peer network;

FIGS. 2a and 2b show a computer in contact with a remote web server directly and via a proxy cache respectively;

FIGS. 6a and 6b show, respectively, an embodiment of the gateway node, and tables of a data store for the node of FIG. 6a;

DETAILED DESCRIPTION OF PREFERRED EMBODIMENTS

It is helpful for understanding the invention to provide some background information on an example of a P2P protocol, as described below the Gnutella protocol, further details of which can be found at http://www.rfc-gnutella.sourceforge.net/.

Figure 1A:
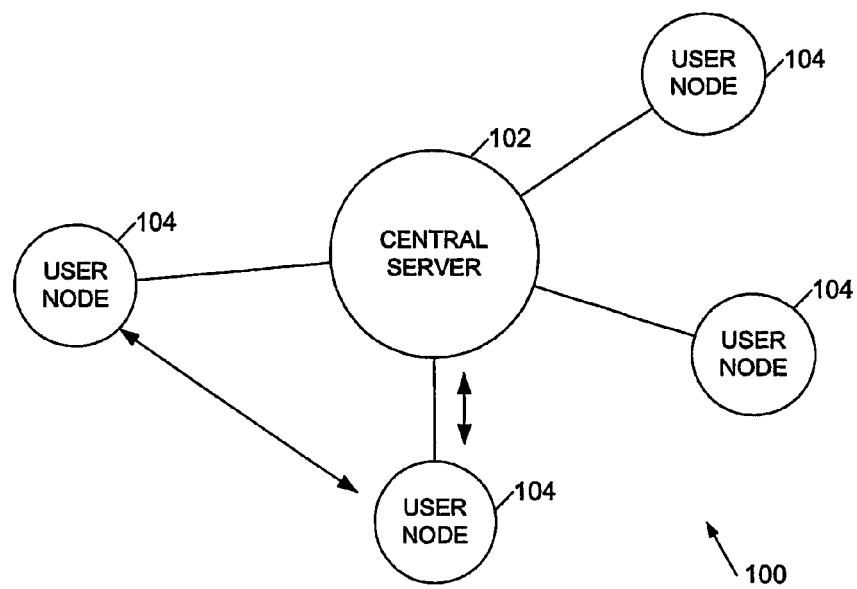
Figure 1B:
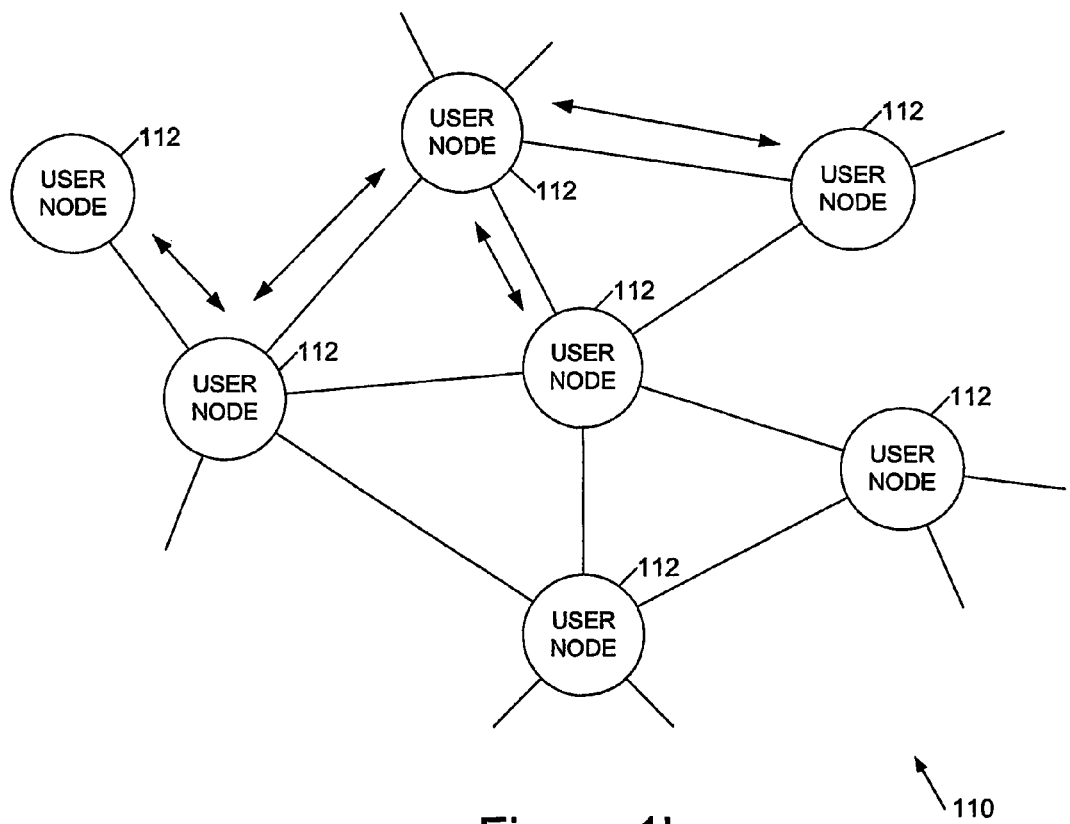
Figure 3A:
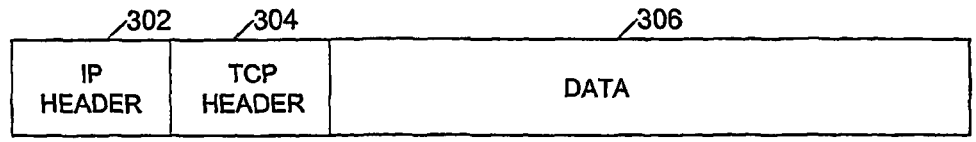
FIGS. 3a to 3f show, respectively, a TCP/IP data packet, a P2P message header, a P2P pong message, a P2P query message, a P2P query hit message, and a P2P Get message.
Figure 3B:
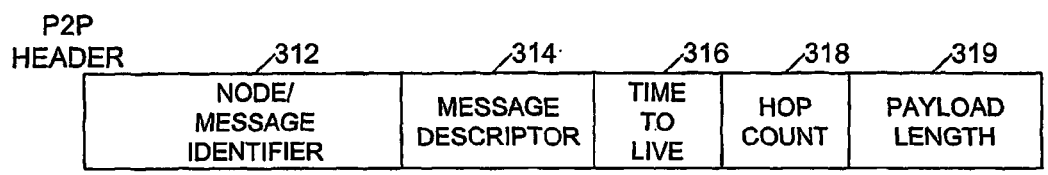

FIG. 3a shows a conventional TCP/IP (transmission control/internet protocol) data packet. 300 comprising an IP header 102 (including IP source and destination addresses), a TCP header 304 (including, among other data, source and destination port numbers) and payload data 306. To connect to a P2P network a Gnutella node operating as a client establishes a TCP connection with a server (servent) and sends a connection request which the server acknowledges. Once a connection is established the two P2P nodes then communicate with each other by exchanging messages, sometimes called (protocol) descriptors. These P2P messages or descriptors each have a header 310 as shown in FIG. 3b comprising a node/message identifier 312, a message function 314, a time to live (TTL) counter 316, a hop count 318 and a payload length field 319. The node/message identifier may comprise a combination of a node identifier and a counter value to create a unique message identifier which can be used, for example, to prevent propagation of duplicate messages arising from loops in the system topology. The message function 314 specifies the message type (Ping, Pong and the like); the hop counter 318 is incremented at each network hop from one peer to another and the TTL counter 316 is correspondingly decremented by one; the payload length assigns the length of the accompanying P2P message.

Figure 3C:
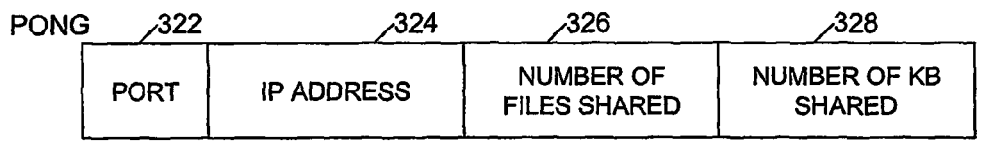
Figure 3D:
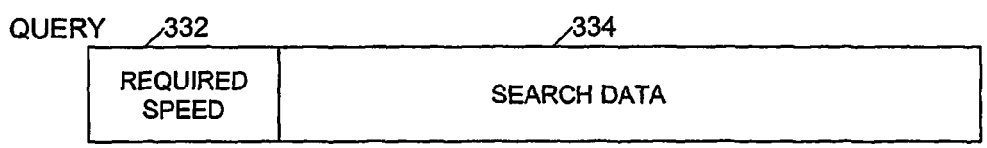
Figure 3E:
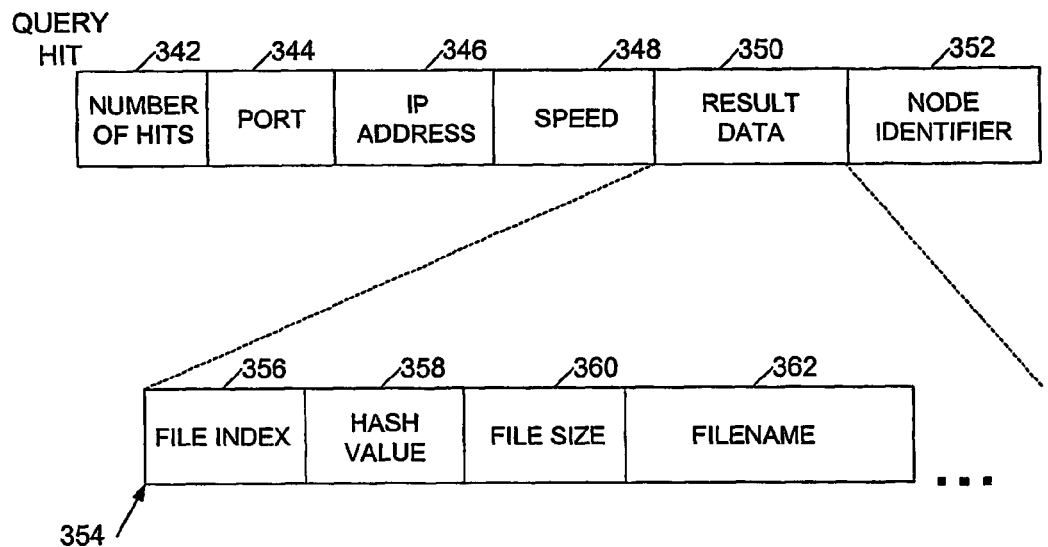
Figure 3F:
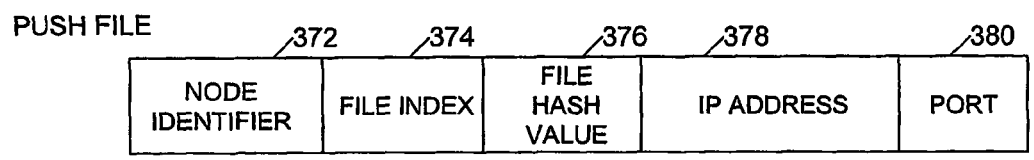

In the Gnutella protocol a Ping message (of zero payload length, not shown in FIG. 3) is used for probing the network and the response by Ping message is a Pong message 320 as shown in FIG. 3c. A Pong message includes a port number 322 and an IP address 324 (those are identified by their IP addresses), together with a field 326 specifying the number of files shared by the node, and a field 328 specifying the number of kilobytes of data shared by the node. Other messages include a query message 330 as shown in FIG. 3d comprising a minimum required speed field 332 and a field 334 carrying search data. The response to a query is a query hit message 340 as shown in FIG. 3e. A query hit message comprises a number of hits field 342, port and IP address fields 344, 346, a (download) speed field 348, result data 350 and a node or servent identifier 352 (such as an IP address). The result data comprises a set of results each having a format 354 comprising a file index 356, a file hash value 358, a file size 360 and a file name 362. The file index 356 is a number which can be used to index a file shared by a node; the hash value 358 is optional. FIG. 3f shows a so-called push message 370 comprising a node identifier 372, a file index 374, a file hash value 376 (optional) and IP address 378, and a port number 380. (Push messages are used to request a host behind a firewall to make an outgoing upload connection to a requesting node).

The Gnutella protocol also includes a set of rules for propagating messages. Thus for Ping and Query messages a node propagating a message to all the nodes to which it is directly connected except the originator of the message, that is ping and query messages are broadcast to all neighbours. Pong, query hit and push messages are sent back along the same path as that which carried the initial associated message (ping or query). A node does not propagate a message with an identical identifier to a message it has previously received. When a message is propagated a node decrements TTL field and increments the hop count.

Once a file has been located it is downloaded using the HTTP (Hyper Text Transfer Protocol) GET command. Thus a query hit includes an IP address and port as well as an index and file size and file name the GET command can be used to request the selected file, indicating the index and file name and a http version number such as version 1.0.

An example of a P2P session is given below:

| Client: | QUERY "Madonna American Pie" |
| Server: | QUERYHIT IP Address |
|  | MADONNA - AMERICANPIE.MP3, |
|  | <INDEX>,<HASH> |
| Client: | GET /get/<INDEX>/ MADONNA - |
|  | AMERICANPIE.MP3 HTTP/1.0 |

Figures 4A, 4B:
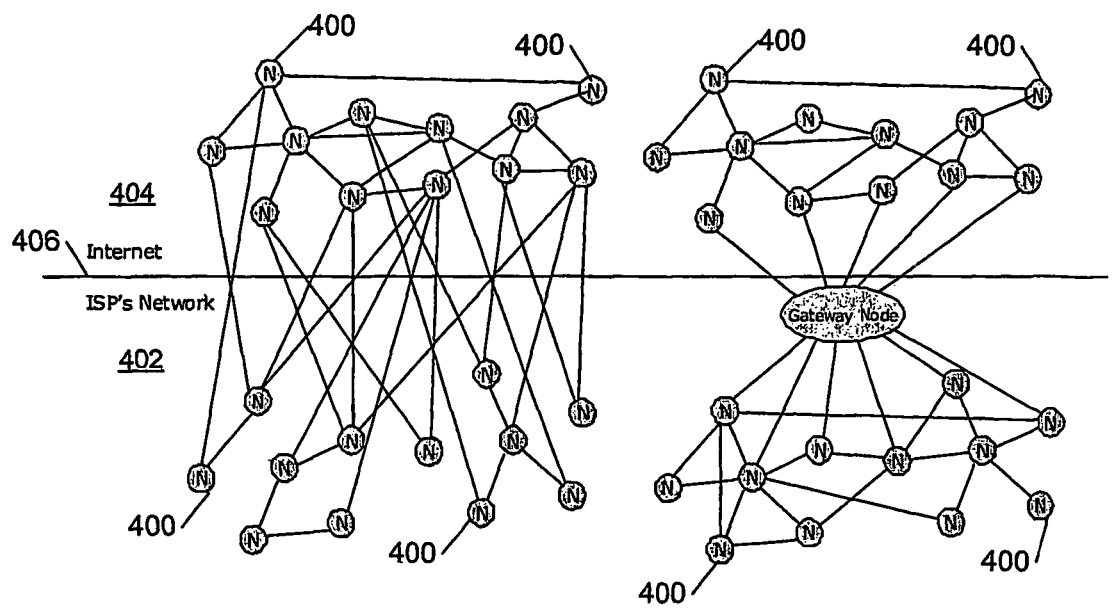
FIGS. 4a to 4c show, respectively, a P2P network, a P2P network including a gateway node, and an implementation of a gateway node.

FIGS. 4a and 4b illustrate the concept of a gateway node. FIG. 4a shows a peer-to-peer network with a plurality of nodes 400 some of which are within a network 402 managed by a service provider, and others of which are located elsewhere in the Internet 404. It can be seen that nodes within the ISP's network each have a number of peers in the outside world which results in a large number of connections (shown as lines in FIG. 4a) across the boundary 406 of the ISP's network. Since every packet which crosses boundary 406 costs the ISP money this results in high network costs. Moreover, the large number of connections lead to an untidy topology which is difficult for the ISP to manage.

The effect of introducing a gateway node 408 comprising an active node on the network which acts as a gatekeeper at the edge of the ISP's network 402. All P2P requests are routed through gateway node 408 and attempts to connect to nodes outside the ISP's network results in connections to the gateway node. This facilitates a high level of interconnectivity within the ISP's network and a small number of fixed connections, for example eight, crossing the expensive ISP boundary 406. Since all traffic is routed through the gateway node 408 this node can form the function of a cache router, a bandwidth throttle, and a content filter. The gateway node 408 monitors and routes P2P traffic transparently and also stores information relating to P2P queries and the associated responses (query hits) in a database. In preferred embodiments queried hits are also rewritten so that they refer (directly or indirectly) to indexes of files on the gateway node. The destination port number and internet address of a query hit may also be rewritten to point to the gateway node. Since the gateway node stores the results of past searches it may itself respond to search queries based upon these stored results. The gateway node 408 may also store contents (files) indexed based upon a key or checksum. A file checksum from a query hit packet may be used to access the database for a subsequent P2P download.

Still referring to FIGS. 4a and 4b, consider a network with a number X of hosts on the ISP network and a number Y of hosts outside the network, each node having P peers which are randomly selected from all the nodes on the network. Then for each connection from each internal node, the likelihood of a peer being outside of the network is:

$$\frac{Y}{X+Y}$$

Therefore, the total number of connections crossing the network border will be:

$$\frac{XPY}{X+Y}$$

Typical values for an ISP with 10,000 active P2P users would be: X=10,000, Y=1,000,000 and P=4. This results in:

$$\frac{10,000 \times 4 \times 1,000,000}{10,000+1,000,000} \approx \frac{4 \times 10^{10}}{10^6} \approx 4 \times 10^4$$

The effect of 40,000 permanently established TCP connections constantly relaying data is that large amounts of data gets transferred over the ISP's boundary resulting in high network costs. In particular, with the Gnutella network, network traffic represents a considerable proportion of the overall P2P traffic, possibly as much as 40% of the overall traffic.

With a gateway node, this is reduced to a small fixed number of connections (typically 8) independent of the number of users on the network. At a simplistic level this reduces the network bandwidth used by a factor of about 5,000, a 99.98% reduction (to accurately model the traffic saving an understanding of the rules about query routing and the prorogation of messages is needed. This is highly specific to the precise P2P network and the configuration of the clients, but the overall results achieved are still approximately the same.)

As previously mentioned, as well as reducing the amount of traffic being relayed the gateway node also stores data based upon the search traffic and responses that it sees. This enables it to build up a database of the locations of files on the network. This information may then be used for intelligent routing and caching of subsequent download requests.

Figure 4C:
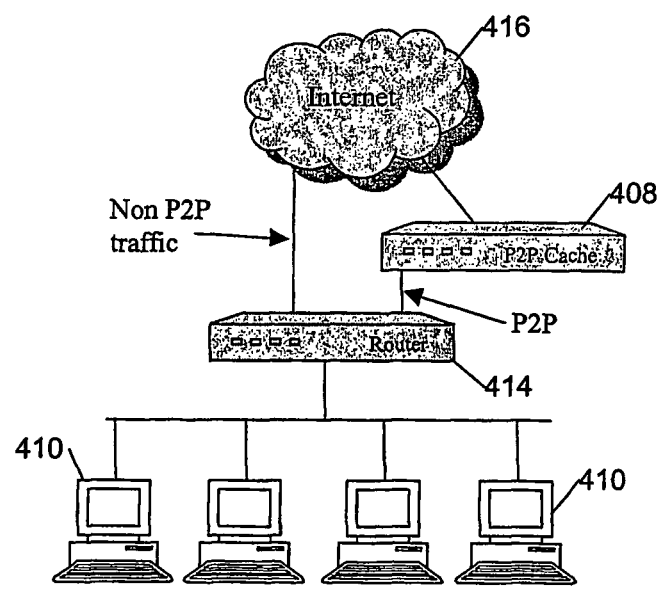

Referring now to FIG. 4c, this illustrates one implementation of a gateway node 408 comprising, in this example, a P2P caching router. As described further below such a P2P caching router may comprise conventional computer hardware coupled with routing hardware and suitable program codes. In FIG. 4c a plurality of computers 410, typically personal computers are coupled via a network 412 to a router 414, network 412 and router 414 typically comprising part of an ISP's network infrastructure. Non P2P traffic from router 414 is routed directly to internet 416 whilst P2P traffic is routed to P2P caching router 408 and thence to internet 416. This allows the ISP to reduce the level of network traffic on the network managed by the ISP and more particularly to reduce amount of "upstream" bandwidth required by the ISP, that is bandwidth to the Internet external to the ISP. The gateway node 408 preferably caches both network and download traffic and may cache one or both of inbound and outbound traffic (forward and reverse) caching. Router 414 may be configured to recognise P2P traffic based upon, for example, the destinations/ports by looking at or snooping packet contents.

Figure 5:
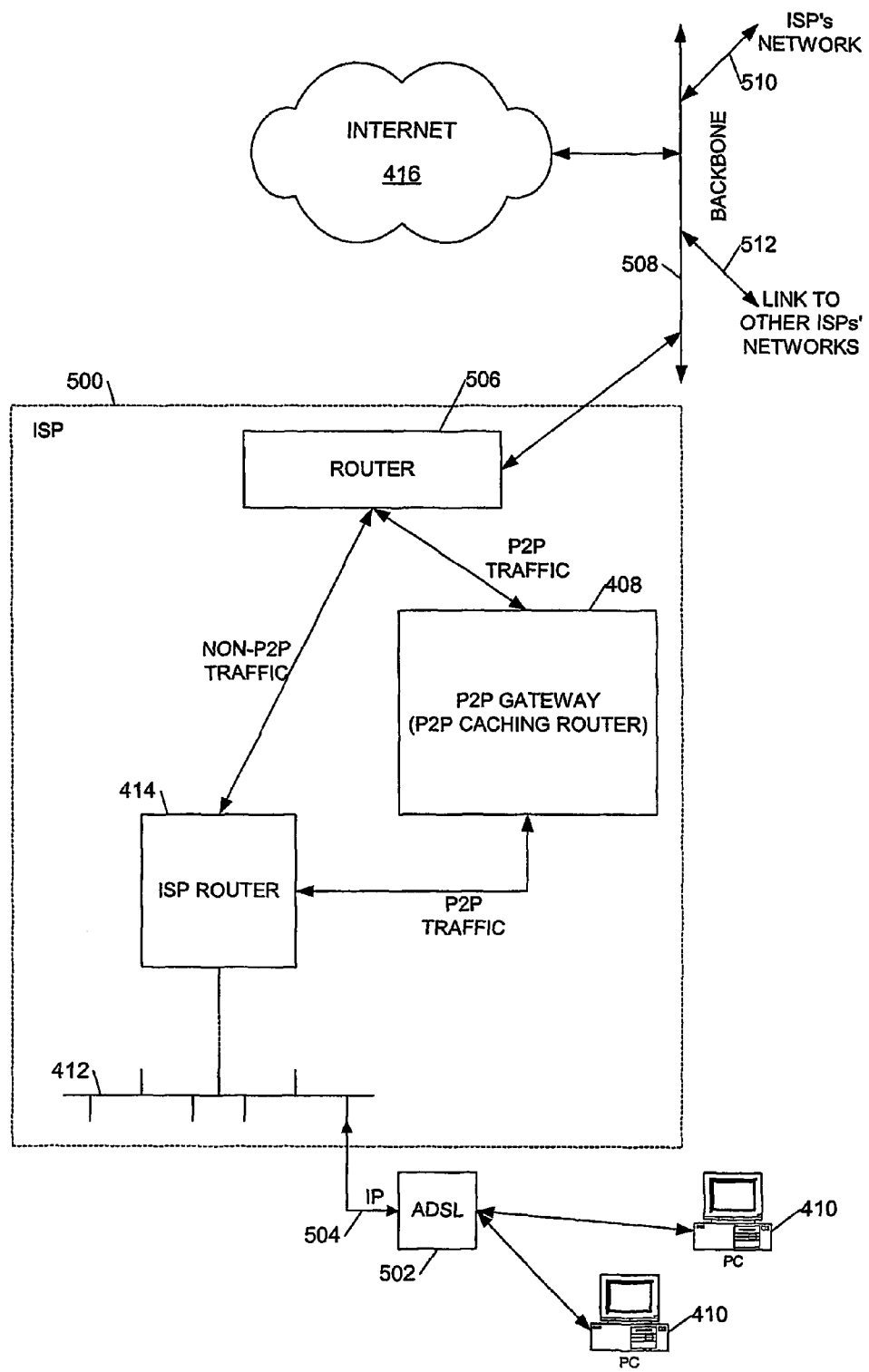
FIG. 5 shows an example of an internet service provider network including a P2P gateway.

Referring now to FIG. 5, this shows further details of the arrangement of FIG. 4c, and like elements are indicated by like referencing rules. Thus in FIG. 5 PCs 410 are coupled to an ADSL (Asymmetric Digital Subscriber Line) or cable modem 502 with an IP backbone connection 514 to a network 412 managed by ISP 500 but typically operating over physical network hardware provided by a telephone or cable company. The ISP router 414 and P2P gateway 408 are, in the example shown coupled to a common router 506 which connects the ISP to a backbone or core network 508 again, for example, provided by a cable company. Router 506 may separate incoming P2P traffic for gateway 408 in a similar way to that in which router 414 handles outgoing P2P traffic or, alternatively, both incoming and outgoing P2P traffic may be identified by router 414 and sent via gateway 408. Backbone 508 may provide a link to other portions of the ISP's network, as well as one or more links 512 to the networks of other internet service providers; generally backbone 508 will also include a high bandwidth connection into the Internet 416.

As previously mentioned, ISP router 414 (and/or router 506) may identify P2P traffic in a number of ways. For example the Gnutella protocol comprises http traffic sent to ports 6346 and 6347, whilst KaZaa comprises HTTP traffic sent to ports 1214 (although version 2.0 of KaZaa selects a random port for incoming P2P connection). The destination port of a P2P message may be read from the message (see, for example, fields 322 of the Pong message shown in FIG. 3c). Where this is no fixed port for a P2P message a P2P packet may potentially be identified by reading the payload of a packet, for example to identify a P2P header or other P2P-protocol format data FIGS. 6a and 6b show details of the P2P gateway 408 of the FIG. 5. Thus the gateway may comprise a conventional computer system including a processor 602, a working memory 604, permanent program memory 606, a data store 608 and (optional) user interface 612 all linked by a common data and control bus 614. The gateway 408 also includes a data communications card 616 linked to bus 614 to provide physical data communications interfaces, packet processing and routing functionality in accordance with control exercise by processor 602. In the illustrated example three data communications connections are provided, a first by direct communications link 618 to an "internal" ISP network, for example physically provided by a cable company, which generally speaking, will not have an associated per byte cost. A second bi-directional communications link 620 may also be provided to a second physical network, for example of a second cable company, which may provide a reduced cost packet data connection. A third bi-directional communications link 622 provides a connection to external networks (the "rest of the world"), in particular the Internet.

Permanent program memory stores operating system code, (optional) user interface code, data communications control code for controlling data communications card 616, TCP/IP code, P2P protocol code, query/queryhit handling code (described below), and download request handling code (described further below). This code is loaded and implemented by processor 602 to provide the corresponding functions for the gateway node 408. Some or all of this code may be provided on a carrier medium illustratively shown by removal of storage medium 607, such as a CD-ROM.

Data store 608 stores cached data files and cached query hits. FIG. 6b shows file cache tables of data store 608 comprising a source table and a cache table. The cache tables are indexed by a cache ID, in which, one embodiment, comprises a number between 0 and $2^{32}$. Files in data store 608 are indexed by the cache ID, in one embodiment a portion of the cache ID comprising a directory identifier and a portion of the cache ID comprising the file name (for example /123/456/789). Files stored in data store 608 may comprise either complete or partial files; in one embodiment data store 608 comprises approximately 1 TB of RAID storage.

In the cache table, associated with the cache ID, is a hash value such as a MD5 or SHA value, and "InOurCache" flag to indicate whether or not the identified file is cached, a time value to provide a timeout for deleting old files, and optionally a file name. Details of the SHA1 (US Secure Hash Algorithm 1) can be found in RFC (Request for Comments) RFC3174; details of message digest (MD) functions such as MD2 and MD5 can be found on the website of RSA Data Security, Inc and in RFCs 1319-1321. Broadly speaking a hash function generates a fixed length output from a variable length input, the output providing a representation of the input file or message. It is desirable that a hash function is collision resistant, that is that it is unlikely that two different input messages will result in the same output. The MD5 algorithm provides a 128 bit (16 byte) fingerprint or message digest of the input in such a way that it is extremely unlikely that two files with different contents will have the same message digest. The SHA1 algorithm is similar but produces a 20 byte output.

The cache ID in the cache table links to one or more Source IDs for one or more remote sources (that is external to the cache), each having an IP address, port and remote machine index. The cache for queries/query hits is similar but includes the file name which is not needed for the file cache.

FIG. 6 illustrates messages flowing in a P2P network including gateway node as illustrated in FIG. 5, showing steps in locating and then downloading a file. The steps show messages flowing between a user node such as one of personal computers 410, the P2P gateway 408 and a remote P2P node such as a node within internet space 404 in FIG. 4b.

Initially user node 410 issues a query 700 which is received by P2P gateway 408. If this query includes a hash value for a requested file the gateway may be able to respond immediately with a query hit 702 specifying a location for the file, either in the cache or in some other location, preferably within the ISP's network. Likewise if P2P gateway 408 includes a cache of query hits previously sent in response to queries, this cache including file names, then even if query 700 does not include a hash value P2P gateway 408 may be able to respond with a query hit 702 based upon a query hit stored in data store 608 in response to a previous similar query.

If P2P gateway 408 is not able to or configured to respond directly to user node 410 query is relayed in accordance with the P2P protocol to a remote P2P node. This broadcasting step may involve preferentially broadcasting to nodes within the ISP's network or otherwise limiting propagation of the query 700 outside the ISP's network. In accordance with the P2P protocol a query hit 704 in response to query 700 is relayed back to P2P gateway 408. Alternatively where P2P gateway 408 does not comprise an active node on the network query hit 704 may nonetheless be sent via P2P gateway 408 by one of routers 414,506.

When query hit 704 is received by P2P gateway 408 the hash value in the query hit is read and if there is no entry for the hash value in the cache 608 the query hit is added to the cache and a corresponding cache ID is created, thus linking the source of the query hit, cache ID and hash value. Optionally the file name may also be included in the cache. Storing query hits in this way facilitates reducing P2P network search traffic.

If on reading the hash value in query hit 704 it is determined a cached version of a requested file exists within data store 608 then the cache ID of the requested file is substituted for the index in the query hit. This is repeated for all the cached files identified in the query hit. Optionally the IP address of the gateway may be substituted for the source address. The port number of the query hit may also be modified to a known or assigned P2P port number to facilitate subsequent identification of a packet as a P2P data packet (particularly where the P2P protocol employs dynamic port allocation).

The query hit 704 is then relayed back to user node 410 which subsequently issues an HTTP GET request to download the file. Although this request is sent to the address and port specified in the query hit the request is intercepted by the P2P gateway 408. Then using either the hash value (present in the GET request) or the index as a cache ID the gateway 408 checks whether the requested file is stored in the cache. If the requested is cached the gateway node 408 responds immediately with the requested file 708 but if the file is not cached the gateway selects a source for the requested file using the source table of data store 608. (Where no source is listed in the cache the gateway may use the source indicated by the requesting user node 410 in the GET request) the gateway 408 then issues its own GET request 710, selecting a source which may be the remote P2P node which responded with query hit 704 or which may comprise an alternative remote P2P node, for example a P2P node on a network which it is cheaper for the ISP to access or more preferably a P2P node within the ISP's own network. The file 712 is then retrieved from this P2P node, stored within the cache, and then served 708 to the requesting user node 410.

Figure 7:
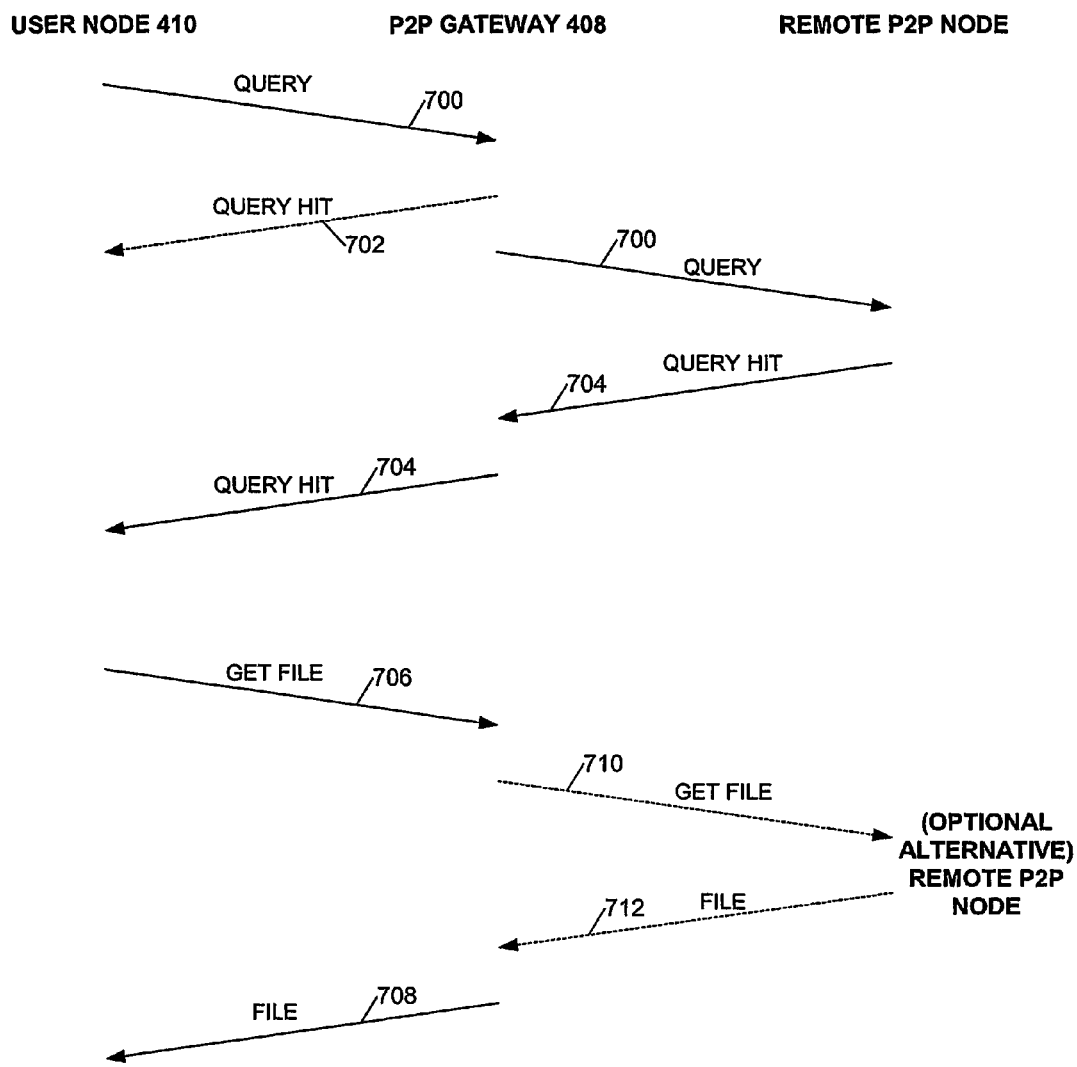
FIG. 7 shows messages in a P2P network including a gateway node.
Figure 8:
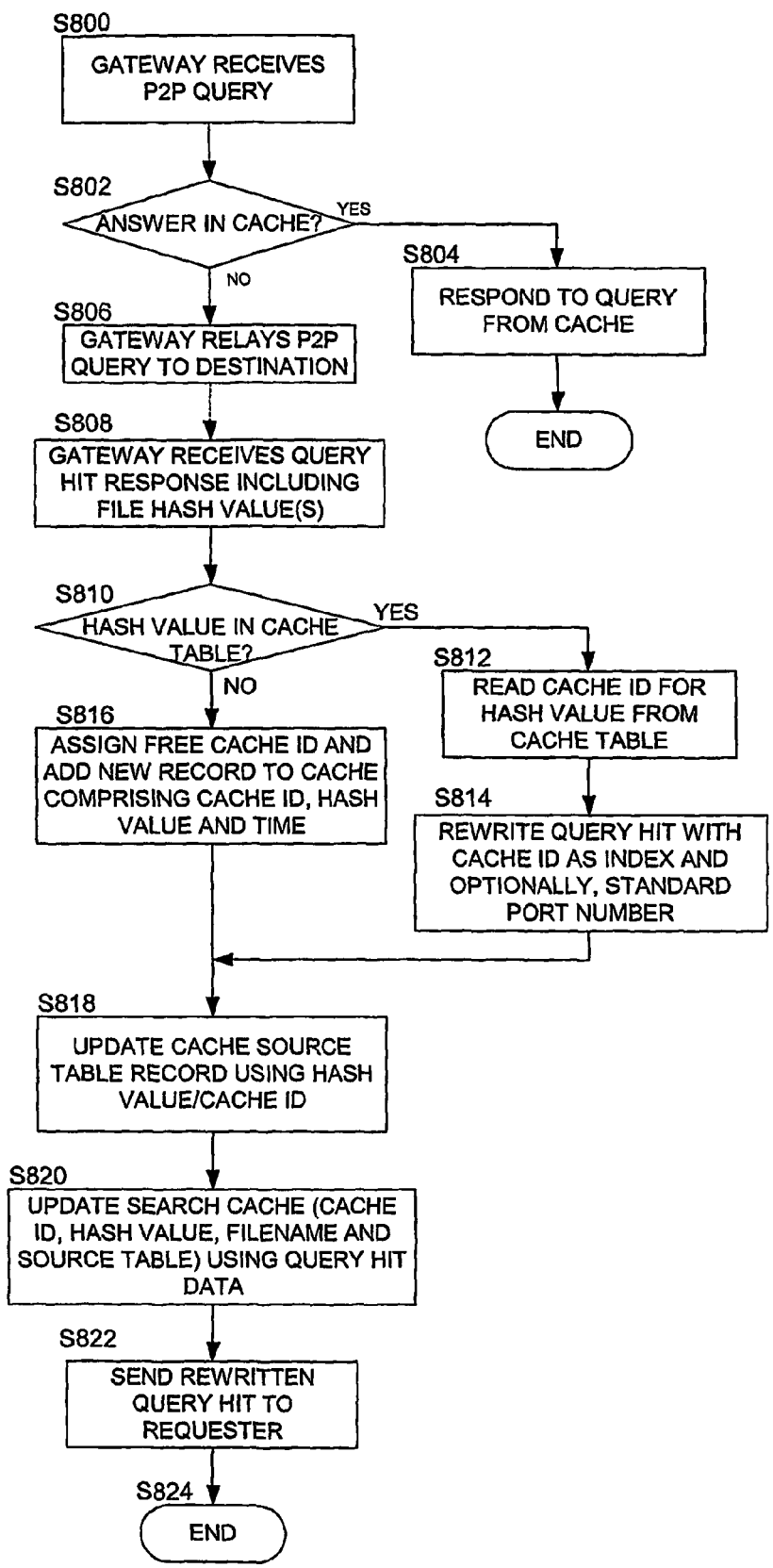
FIG. 8 shows processing of a P2P query/query hit at a gateway node.
Figure 9:
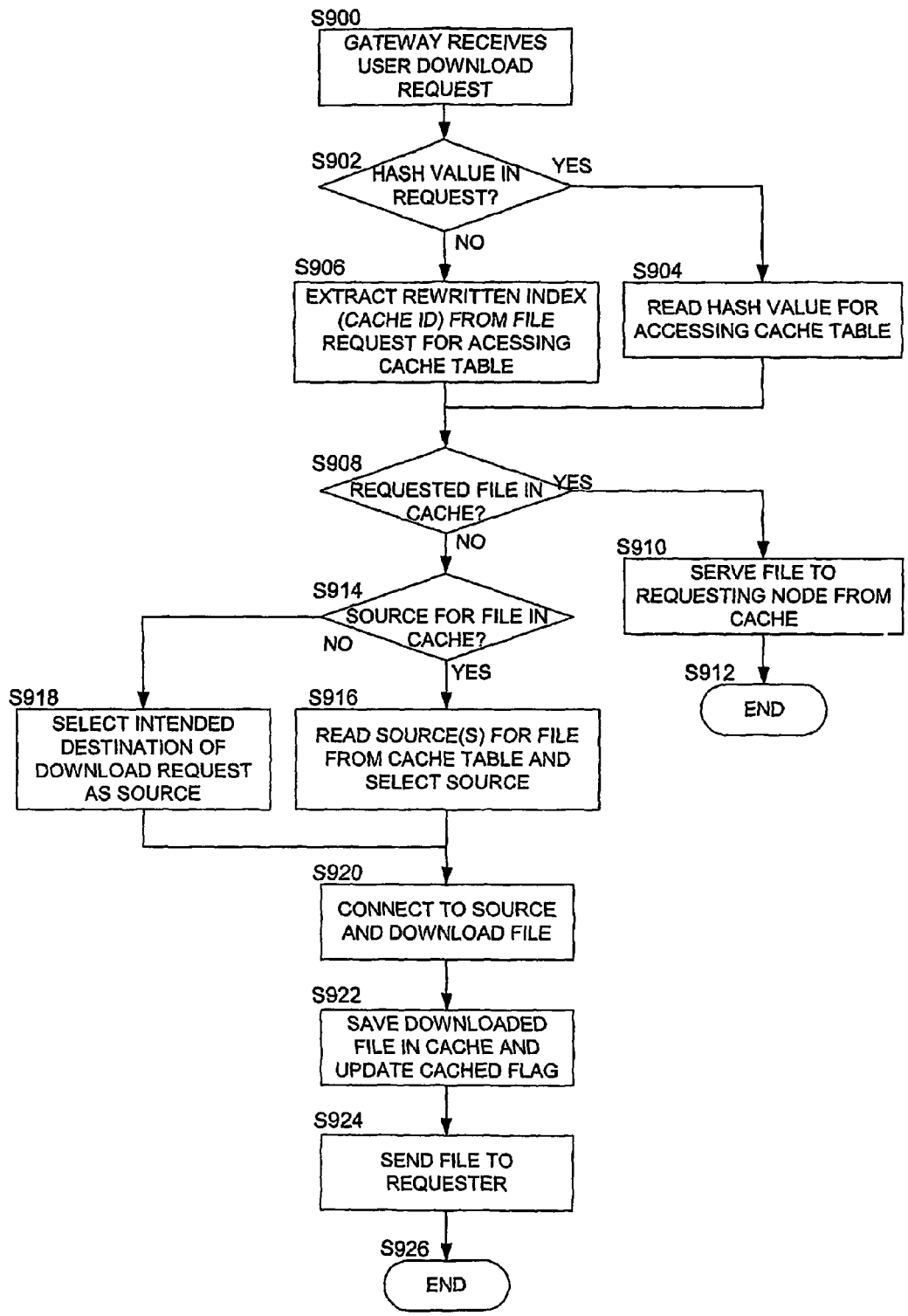
FIG. 9 shows processing of a P2P download request at a gateway node.

FIGS. 8 and 9 show flow diagrams illustrating in more detail the procedure described above in reference to FIG. 7 described above.

FIG. 8 illustrates the operation of an embodiment of query/queryhit handling code within gateway 408. Thus at step S800 the gateway 408 receives a P2P query and, at step S802 and checks whether it is able to respond from the cache. If gateway 408 is able to respond from the cache it does so at step S804 and the procedure then ends. However if the gateway is unable to respond directly it relays the query to its intended destination at step S806 and then waits to receive a query hit response including one or more file hash values at step S808. The gateway node then checks, at step S810, whether the one or more hash values received at step S808 are in the cache table of data source 608.

If there is no entry for hash value within the cache table then, at step S816, the gateway node assigns a free cache ID to the hash value and adds a new record to the cache table comprising the assigned cache ID, the hash value and a time/date stamp. If the hash value is present then, at step S812, the corresponding cache ID is read from the cache table and, at step S814, the query hit is rewritten with the cache ID as the index and, optionally, with a standard P2P protocol port number to facilitate later P2P packet processing. Although it is not necessary the gateway also rewrites the IP address in the query hit to point to the gateway.

The procedure then updates the cache source table record using the hash value and/or cache ID index (S818) to add a new source table record comprising a source ID, cache ID, IP address, port and remote (machine) index. Optionally at step S820 a search cache comprising corresponding information but also including a file name (to facilitate responding to queries without hash values) may also be updated at step 820. Then at step S822 the rewritten query hit is sent back to the requester and the procedure ends at step S824.

FIG. 9 shows a flow diagram of a procedure for handling a user download request received from a node such as user node 410.

At step S900 the gateway node 408 receives a user download (GET) request and at step S902 checks whether the request includes a hash value. If the request does include a hash value this is read, at step S904 for accessing the cache tables; if not the rewritten index, that is the cache ID, is extracted from the file request for accessing the cache table (step S906). Then, at step S908 this procedure checks whether the request is filed within the cache and if so serves the file to the requesting node from the cache (step S910) and the procedure then ends at step S912. If the requested file is not in the cache the procedure checks at step S914, whether or not a source identifier for the requested file is stored in the cache. If so, at step S916, the available sources for the file are read from the cache and one is selected, either randomly or based upon a cost (monetary or otherwise). For example an internet service provider may have an arrangement with a cable company to provide access to users connected to that cable company network at reduced rates compared with other upstream access from the ISP's network. If, at step S914, there is no source for the file identified in the cache the intended destination of the downloaded request is selected as the source (step S918), for example from the "envelope" of the download request. Then, at step S920, the gateway connects to the identified source and downloads the requested file, saving it in the cache and updating the InOurCache flag (S922) and sending the file to the requester (S924) the procedure then ending at step S926. It will be appreciated that even when the gateway node is unable to read the network search traffic, for example because it is encrypted, where the download request includes a hash value a file may be served to the requester from the cache to significantly reduce at least download traffic on the P2P network. It will further be appreciated that a requesting user may obtain so called FastTrack file access by simply sending a GET result including the hash value for the desired file to the gateway (since the hash function algorithms are widely known hash values for commonly accessed files may be readily listed).

No doubt many other effective alternatives will occur to the skilled person. For example although specific embodiments of the invention have been described with reference to P2P networks operating over TCP/IP, the principals described above may be applied to P2P networks operating over other protocols (e.g. UDP), and in other environments such as, for example, mobile communications systems, wireless computer networks and alike.

The invention encompasses modifications apparent to those skilled in the art lying within the scope of the amended claims.

What is claimed is:

1. A method of reducing traffic in a decentralized peer-to-peer network, said decentralized peer-to-peer network operating over an underlying network comprising first and second network portions, the method comprising:
   identifying, with an Internet Service Provider (ISP) router, whether messages in the first network portion are peer-to-peer messages or other messages;

routing all peer-to-peer messages in the first network portion with an intended destination in the second network portion outside of a network of an Internet Service Provider (ISP) to a gateway between peer-to-peer nodes residing on said first and second network portions; and controlling transport of said peer-to-peer messages at said gateway to limit propagation of said peer-to-peer messages into said second network portion, wherein the other messages directly flow from the ISP router into the second network portion, while the peer-to-peer messages only flow through the gateway into the second network portion.

2. The method of claim 1, wherein said first network portion comprises a portion of said underlying network managed by the ISP and said second network portion comprises a portion of said underlying network not managed by the ISP that is connected to said first network portion across a boundary.

3. The method of claim 2, further comprising:
limiting a number of peer-to-peer connections across said boundary to a permitted maximum.

4. The method of claim 1, wherein said transport controlling further comprises:
blocking said peer-to-peer messages at said gateway.

5. The method of claim 1, wherein said transport controlling further comprises:
redirecting said peer-to-peer messages to a peer-to-peer node within said first network portion.

6. The method of claim 1, wherein said transport controlling further comprises:
responding to said peer-to-peer messages from said gateway.

7. The method of claim 6 wherein said peer-to-peer messages comprise queries, and wherein said responding further comprises:
sending a response to said queries comprising cached data derived from previous responses to the queries.

8. The method of claim 6, wherein said peer-to-peer messages comprise file requests, and wherein said responding further comprises:
sending a response to said file requests comprising previously cached data for a requested file.

9. The method of claim 1, wherein said peer-to-peer messages comprises file request messages, and wherein said controlling further comprises:
modifying a response to a previous file search request such that said response does not indicate that a requested file may be found in said second network portion.

10. The method of claim 9, wherein said requested file is identified by a hash value.

11. The method of claim 9, further comprising:
storing requested files in a cache, wherein said response is modified to refer to said cache.

12. The method of claim 9, wherein said underlying network comprises a third network portion, and wherein said modifying further comprises:
modifying said response to indicate that said requested file is obtainable from a peer-to-peer node located on said third network portion.

13. The method of claim 1, wherein said physical network comprises a third network portion, wherein use of each of said network portions has an associated cost, wherein data transport over said third network portion has a cost less than a cost associated with said second network portion, and wherein said controlling further comprises:

directing said peer-to-peer messages into said third network portion.

14. The method of claim 1, wherein said peer-to-peer messages have message identifiers, and wherein said controlling further comprises:
storing said message identifiers for said peer-to-peer messages;
monitoring message identifiers of the peer-to-peer messages passing through said gateway to produce identified messages; and
limiting propagation of said identified messages such that said messages pass between said first and second network portions no more than a permitted maximum number of times.

15. The method of claim 14, wherein said permitted maximum number of times is one.

16. A computer network message controller that reduces traffic in a decentralized peer-to-peer network, said decentralized peer-to-peer network operating over a physical network comprising first and second network portions, said network message controller comprising:
a router that is configured to identify whether messages in the first network portion are peer-to-peer messages or other messages and route all peer-to-peer messages in the first network portion with an intended destination in the second network portion outside of a network of an Internet Service Provider (ISP) to a gateway between peer-to-peer nodes residing on said first and second network portions; and
a gateway controller that is configured to control transport of said peer-to-peer messages into said second network portion, wherein the other messages directly flow from the router into the second network portion, while the peer-to-peer messages only flow through the gateway into the second network portion.

17. The computer network message controller of claim 16, wherein said first network portion comprises a portion of said physical network managed by the ISP and said second network portion comprises a portion of said physical network not managed by the ISP that is connected to said first network portion across a boundary.

18. The computer network message controller of claim 17, wherein said gateway controller is configured to limit a number of peer-to-peer connections across said boundary to a permitted maximum.

19. The computer network message controller of claim 16 wherein said gateway controller is configured to block the peer-to-peer messages at said gateway.

20. The computer network message controller of claim 16 wherein said gateway controller is configured to redirect the peer-to-peer messages to a peer-to-peer node within said first network portion.

21. The computer network message controller of claim 16 wherein said gateway controller is configured to respond to the peer-to-peer messages.

22. The computer network message controller of claim 21, further comprising:
a cache that is configured to store data, wherein said peer-to-peer messages comprise queries, and wherein said gateway controller is configured to send a response to said queries including data from said cache.

23. The computer network message controller of claim 21 wherein said peer-to-peer messages comprise file requests, further comprising:
a cache that is configured to store data derived from previous responses to file requests, and wherein said gateway controller is configured to send a response to said file request including data from said cache.

24. The computer network message controller of claim 16, wherein said peer-to-peer messages comprise file request messages, and said gateway controller is configured to modify a response to a previous file search request such that said response does not indicate that a requested file may be found in said second network portion.

25. The computer network message controller of claim 24, wherein said requested file is identified by a hash value.

26. The computer network message controller of claim 24, further comprising:
a cache that is configured to store requested files, wherein said gateway controller is configured to modify said response to refer to said cache.

27. The computer network message controller of claim 16 wherein said underlying network further comprises:
a third network portion, wherein said gateway controller is configured to modify said response to indicate that said requested file is obtainable from a peer-to-peer node located on said third network portion.

28. The computer network message controller of claim 16, wherein said peer-to-peer messages have message identifiers, and wherein said gateway controller is configured to store said message identifiers for said peer-to-peer messages, monitor message identifiers of the peer-to-peer messages passing through said gateway to produce identified messages, and limit propagation of said identified messages such that said identified messages pass between said first and second network portions no more than a permitted maximum number of times.

29. The computer network message controller of claim 28, wherein said permitted maximum number of times is one.

30. The computer network message controller of claim 16, wherein said gateway controller further comprises:
a processor, and
a program memory that is configured to store processor control code coupled to said processor to load and implement said code.

31. A gateway controller, that is configured to reduce traffic in a decentralized peer-to-peer network operating over an underlying network comprising first and second network portions, the gateway controller operating at a gateway between peer-to-peer nodes residing on said first and second network portions, the gateway controller comprising:
an interface for said first and second network portions, that is configured to receive all peer-to-peer messages in the first network portion with an intended destination in the second network portion outside of a network of an Internet Service Provider (ISP), wherein a router is configured to identify whether messages in the first network portion are peer-to-peer messages or other messages; and
a controller that is configured to limit propagation of the peer-to-peer messages into the second network portion, wherein the other messages directly flow from the router into the second network portion, while the peer-to-peer messages only flow through the gateway into the second network portion.

32. The gateway controller of claim 31, wherein said controller is configured to block the peer-to-peer messages at said gateway.

33. The gateway controller of claim 31, wherein said controller is configured to redirect the peer-to-peer messages to a peer-to-peer node within said first network portion.

34. The gateway controller of claim 31, wherein said controller is configured to respond to the peer-to-peer messages.

35. The gateway controller of claim 34, further comprising:
a query cache that is configured to store data derived from responses to queries, wherein said controller is configured to respond to the queries using data from said query cache, and the peer-to-peer messages comprise queries.

36. The gateway controller of claim 34, further comprising:
a file request cache that is configured to store data derived from responses to file requests, wherein the peer-to-peer messages comprise file requests and said controller is configured to respond to said file requests using data from said file request cache.

37. The gateway controller of claim 31, wherein said peer-to-peer messages comprise file request messages, and said controller is configured to modify a response to a previous file search request such that said response does not indicate that a requested file may be found in said second network portion.

38. The gateway controller of claim 37, wherein said requested file is identified by a hash value.

39. The gateway controller of claim 37, further comprising:
a cache that is configured to store requested files, wherein said controller is configured to modify said response to refer to said cache.

40. The gateway controller of claim 31, wherein said underlying network further comprises:
a third network portion, wherein said controller is configured to modify said response to indicate said requested file is obtainable from a peer-to-peer node located on said third network portion.

41. The gateway controller of claim 31, wherein the peer-to-peer messages have message identifiers, said controller is configured to store said message identifiers for the peer-to-peer messages, monitor the message identifiers of the peer-to-peer messages passing through said gateway to produce identified messages, and limit propagation of said identified messages such that said peer-to-peer messages pass between said first and second network portions no more than a permitted maximum number of times.

42. The gateway controller of claim 41, wherein said permitted maximum number of times is one.

43. The gateway controller of claim 31, wherein said first network portion comprises a portion of said underlying network managed by the ISP and said second network portion comprises a portion of said underlying network not managed by the ISP that is connected to said first network portion across a boundary, and wherein said controller is configured to provide a limited number of peer-to-peer connections across said boundary.

44. The gateway controller of claim 31, wherein said controller further comprises:
a processor; and
a program memory that is configured to store processor control code coupled to said processor to load and implement said code, said code comprising code to configure said controller to control transport of said message into said other of said network portions.

* * * * *